Dec. 22, 1964  HIROSHI YAMADA  3,162,769
DATA-TRANSFER GATES
Filed Dec. 30, 1960  6 Sheets-Sheet 1

United States Patent Office 3,162,769
Patented Dec. 22, 1964

3,162,769
DATA-TRANSFER GATES
Hiroshi Yamada, Tokyo, Japan, assignor to Fuji Toushinki Seizo Kabushiki Kaisha, Kawasaki, Japan, a company of Japan
Filed Dec. 30, 1960, Ser. No. 79,827
Claims priority, application Japan, Oct. 22, 1955, 30/27,776; Nov. 2, 1955, 30/28,787
12 Claims. (Cl. 307—88)

This application is a continuation-in-part of our application, Serial No. 616,565, filed October 17, 1956, and relates to switching circuitry and more particularly to data-transfer gates using parametron networks connected in various gate circuit configurations.

It is a principal object of the present invention to use parametrons as gating elements to provide new gate circuit arrangements usable in computers and automatic devices.

A feature of the data-transfer gate according to the invention is provision of an even number of binary-coded control inputs to the resonant circuits of the gating elements, which are parametrons, which control the selection and transfer of input information, binary-coded, providing one of the control inputs is representative of a binary digit other than a binary digit the information signal is representative of and in dependence upon the combination of binary conditions applied to parametrons of the data-transfer circuit stage receptive of the data to be transferred so that only one input is transferred to an output parametron of a data-transfer gate.

Another feature is the provision of a constant value, binary condition, to one of the phase control inputs of the gating parametrons in the gate arrangement.

The gating parametrons are arranged in a first and a second stage in cascade. An output parametron is connected in cascade with the second stage so that the output of its resonant circuit has its phase corresponding to a binary condition under control of a gating parametron. At least the first stage of the parametrons are connected in parallel and the binary-coded information oscillations and binary phase control input oscillations are applied along parallel paths to the first stage of parametrons.

In some embodiments of a gate the second stage comprises at least two parallel parametrons and common phase control inputs are applied to the parametrons to the first and second stages. Constant values or binary conditions can also be applied to the gating parametrons in the second stage and a third stage of the gating parametrons.

Other features and advantages of data-transfer gate circuitry according to the invention will be better understood as described in the following specification and appended claims, in conjunction with the following drawings in which:

In order to understand the present invention a brief description of the basic digital component, the parametron, follows.

Parametric oscillation, from which the name "Parametron" derives, is not an unfamiliar phenomenon—a playground swing and Melde's experiment are examples of parametric oscillations in mechanical systems. In order to drive a swing, the rider bends and then straightens his body and thereby changes the length $l$ between the center of gravity of his body and the fulcrum of the ropes. The swing is a mechanical resonant system and its resonant frequency is determined by this length $l$ and the gravitaional constant $g$. The oscillation of the swing is energized by the periodic variation of the parameter $l$ which determines the resonant frequency.

Figure 1:
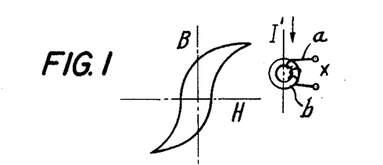
FIG. 1 is a diagram of a core, with a coil developed thereon, and its B–H curve for illustrating parametric oscillation.
Figure 2:
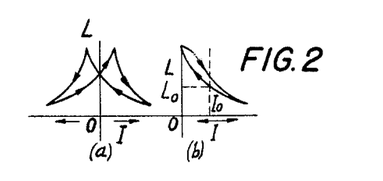
FIGS. 2a and 2b are schematic diagrams of inductance change in the coil of FIG. 1 in parametric oscillation.

It is known that when an alternating current I is applied to terminals X on winding $a$ on a ferrite core $b$ as in FIG. 1, having a B–H curve as shown, the inductance L thereof varies as shown in FIG. 2a. If a frequency or current which changes in one direction between zero and some other value is applied to the winding, where $I_0$ is the center current, then inductance L varies as shown in FIG. 2b. The total current I, consisting of the direct current $I_0$ and the high frequency current having an angular frequency $\omega$, flows through the terminals X and the inductance changes by the angular frequency $\omega$. This is known as parameter excitation.

Figure 3:
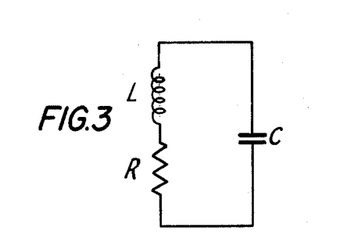
FIG. 3 is a schematic diagram of a resonant circuit for illustrating the theory of parametrons.

In an electrical system, inductance and capacitance are the parameters which determine the resonant frequency. Parametric oscillation, therefore, can be produced in a resonant circuit, FIG. 3, by periodically varying one of the reactive elements, L, C, composing the resonant circuit.

Figure 4:
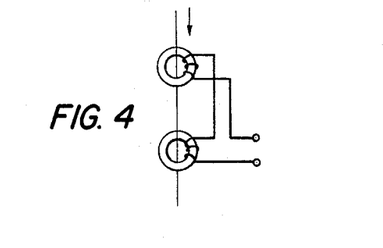
FIG. 4 is a diagram of a pair of nonlinear reactors usable in construction of a parametron.

A parametron element is essentially a resonant circuit with a reactive element varying periodically at frequency $2f$ which generates a parametric oscillation at the subharmonic frequency $f$. In practice, the periodic variation is accomplished by applying an exciting current of frequency $2f$ to a pair of nonlinear reactors, such as ferrite-core coils (FIG. 4) and a resonant circuit of nonlinear elements and connected as later herein described.

Figure 5:
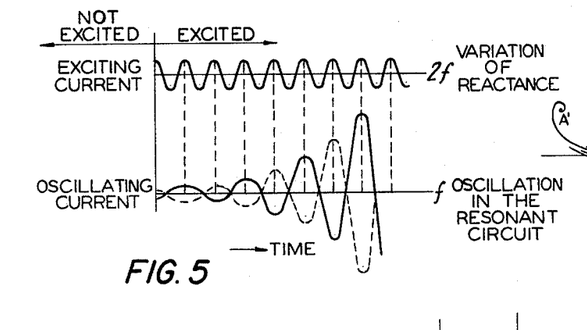
FIG. 5 is a diagram illustrative of the oscillations of parametrons.

The subharmonic parametric oscillation thus generated has a remarkable property in that the oscillation will be stable in either of two phases which differ by $\pi$ radians with respect to each other. Utilizing this fact, a parametron represents and stores one binary digit, "0" or "1," by the choice between these two phases, 0 or $\pi$ radians. The solid line and the dotted line in FIG. 5 illustrate the building up of these two kinds of oscillation.

Under certain resonance conditions, the oscillation generated in the parametron is "soft," that is, it is easily self-started from any small initial amplitude. In this case, the choice between the two stable phases of the oscillation having a large amplitude can be made by controlling the phases of the small initial oscillation. This fact may be regarded as amplification and its mechanism may best be understood as superregeneration with the phase of the oscillation representative of two stages. In order to make use of this effectively, quenching means are provided in parametron circuits to interrupt parametric oscillation. Besides the memory and amplifying action, parametrons can also perform various logical operations based on a majority principle by applying the algebraic sum of oscillation voltages of an odd number of parametrons to another parametron in which the algebraic sum voltage works as the small initial oscillation voltage.

Mathematical studies on parametric oscillations of small amplitude in a linear region have been conducted in detail in the past. The results will be found in textbooks on differential equations under such headings as linear differential equations with periodic coefficients, Mathieu's equation, Hill's equation, and Floque's theorem.

The application of parametric oscillation to amplifying electrical signals is not a new idea. United States Patent 1,884,845 discloses an amplifier based on the same principle as the parametric amplifier, which is now one of the most discussed topics in the field of electronics. In a parametric amplifier, two resonant circuits, respectively tuned to signal frequency $f_s$, and idling frequency $f_i$, are coupled together regeneratively through a nonlinear reactor to which is applied a voltage of pumping frequency $f_p$, satisfying the condition $f_p = f_i + f_s$. A parametric amplifier performs regenerative amplification of signals and may produce as well, a pair of spontaneous oscillations at frequency $f_s$ and $f_i$.

A parametron producing a subharmonic oscillation may be regarded as a degenerative case of a parametric amplifier, in which the two resonant circuits for $f_s$ and $f_i$ are reduced to a single common circuit, so that $f_s = f_i = f$, and $f_p = 2f$. Consequently, the basic principle of the amplifying mechanism of the parametron may be considered the same as that of the parametric amplifier. The degeneracy in the number of resonant circuits, however, makes possible the phase quantizing nature of the oscillation. While this is generally unfavorable for amplifying ordinary continuous waves, it is very useful for representing and storing a binary digit in the parametron.

Figure 6:
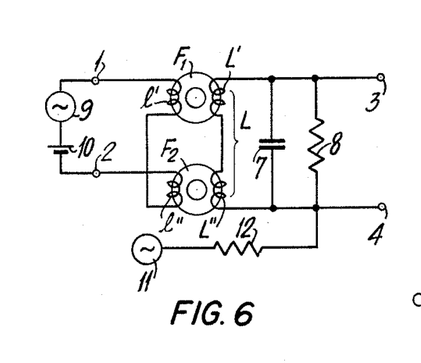
FIG. 6 is a schematic diagram of a parametron.

The parametron is essentially a resonant circuit in which either the inductance or the capacitance is made to vary periodically. FIG. 6 shows a circuit diagram for a parametron element. The parametron element in FIG. 6 consists of coils wound around two magnetic ferrite toroidal cores F1 and F2, a capacitor 7, and a damping resistor 8 in parallel. Each of the cores F1 and F2 has two windings and these are connected together in a balanced configuration. One winding $L=L'+L''$ forms a resonant circuit with the capacitor 7 and is tuned to frequency $f$. An exciting current is applied at input terminal 1, 2 and is a superposition of a radio frequency current of frequency $2f$, from source 9 and a D.C. bias from D.C. source 10 is applied to the other winding, $1'+1''$, causing periodic variation in the inductance $L=L'+L''$ of the resonant circuit at frequency $2f$.

A second subharmonic parametric oscillation is generated in the resonant circuit to which is connected output terminals 3, 4. The phase of his parametric or output oscillation is dependent upon the phase of an input control oscillation of frequency $f$ applied to the resonant circuit from an oscillator 11 or some similar source coupled to the resonant circuit, for example, through a coupling resistance 12.

The operation of the parametron is based on a spontaneous generation of a second subharmonic parametric oscillation, that is a self-starting oscillation of frequency $f$, in the resonant circuit. Parametric oscillation is usually treated and explained in terms of Mathieu's equation. A more easily understood explanation, however, may be obtained by the following consideration.

Let the inductance $L$ of the resonant circuit be varied as $$L=L_0(1+2\Gamma \sin 2\omega t) \qquad (1)$$

where $\omega=2\pi f$, $\Gamma$ (gamma) represents the modulus of parametric excitation, and let us assume the presence of a sinusoidal A.C. current $I_f$ in the resonant circuit at frequency $f$, which can be broken down into two components as follows:

$$I_f = I_s \sin(\omega t) + I_c \cos(\omega t) \qquad (2)$$

Then, assuming that the rate of the variation of amplitudes of the sine and cosine components, $I_s$ and $I_c$, are small compared with $\omega$, the induced voltage $V$ will be given by $$V = d/dt(LI_f) = \omega L_0(I_s \cos \omega t - I_c \sin \omega t)$$
$$+ 3\Gamma\omega L_0(I_s \sin 3\omega t + I_c \cos \omega t)$$
$$+ \Gamma\omega L_0(-I_s \sin \omega t + I_c \cos \omega t) \qquad (3)$$

The first term shows the voltage due to a constant inductance $L_0$, and the second term or the third harmonic term may be neglected in our approximation, since it is off resonance. The third term, which is essential for the generation of the second subharmonic, shows that the variable part of the inductance behaves like a negative resistance $-r=-\Gamma\omega L_0$ for the sine component $I_s$, but behaves like a positive resistance $+r=\Gamma\omega L_0$ for the cosine component $I_c$.

Figure 7:
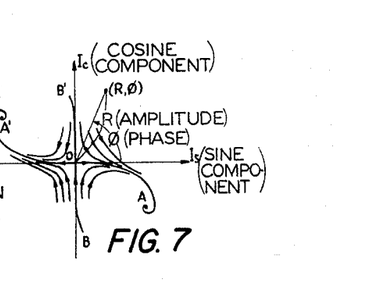
FIG. 7 is a diagram of the amplitude-to-phase (R, $\phi$) locus of an oscillating parametron.
Figure 8:
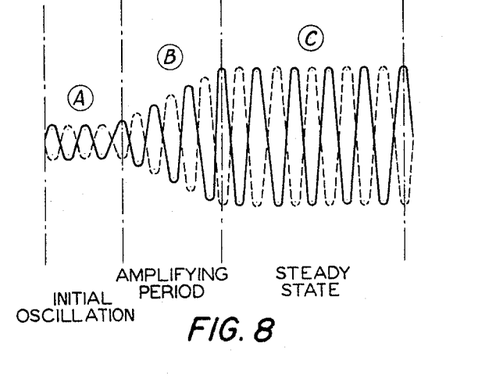
FIG. 8 is a diagram on an enlarged scale illustrative of the oscillations of parametrons.

Therefore, provided that the circuit, FIG. 6, is nearly tuned to $f$, the sine component $I_s$ of any small oscillation (Ⓐ in FIG. 8), will build up exponentially (Ⓑ in FIG. 8), while its cosine component will damp out rapidly. If the circuit were exactly linear, the amplitude would continue to grow indefinitely. Actually, the nonlinear B–H curve of the cores causes detuning of the resonance circuit and hysteresis loss also increases with increasing amplitude, so that a stationary state (Ⓒ in FIG. 8) will rapidly be established, as in vacuum-tube oscillators. The parametron has an amplitude limiting mechanism, which is essentially a nonlinear problem. The solution of the problem will be illustrated most readily by showing the locus of the sine and cosine components, $I_s$ and $I_c$ in the ($I_s$, $I_c$) plane. FIG. 7 shows an example of such loci for a typical case $\alpha=0$, $\delta=\Gamma/2$. It will be understood that in this example the small symbol or letter alpha $\alpha$ is representative of detuning, the small delta $\delta$ is the damping factor and capital gamma $\Gamma$ represents the modulus of parametric excitation. The abscissa represents the sine component $I_s$ and the ordinate, the cosine component $I_c$. If I introduce polar coordinates (R, $\phi$) in the ($I_s$, $I_c$) plane, it will be easily seen from (1) that R and $\phi$, respectively, indicate the instantaneous amplitude and phase of the oscillation. The saddle point at the origin indicates the exponential build up of oscillation which is in a definite phase relation to the excitation wave of frequency $2f$. Spiral points A and A' in the figure indicate the stable states of stationary oscillation. The existence of two possible phases in this oscillation which differ by π radians from each other, corresponding to A and A', should be noted. These two modes of oscillation are respectively shown by the solid line and dotted line in FIGS. 5 and 8. An especially important feature is that the choice between these two modes of stationary oscillation is effected entirely by the sign of the sine component of the small initial oscillations that have existed in the circuit (Ⓐ in FIG. 8). In other words, the choice between A and A' in FIG. 7 depends on which side of the thick curve B–B' (called separatrix) the point representing the initial state lies. An initial oscillation of quite small amplitude is sufficient to control the mode or the phase of stationary oscillation of large amplitude which is to be used as the output signal. Hence, the parametron has an amplifying action which may be understood as superregeneration. The upper limit of this superregenerative amplification is believed to be determined only by the inherent noise, and an amplification of as high as 100 db has been reported.

The existence of dual mode of stationary oscillation can be made use of to represent a binary digit, "0" and "1" in a digital system, and thus a parametron can store 1 bit of information. However, oscillation of parametrons in this stationary stage is extremely stable, and if one should try to change the state of an oscillating parametron from one mode to another just by directly applying a control voltage to the resonant circuit, a signal source as powerful as the parametron itself would be necessary. This difficulty can be gotten around by providing a means for quenching the oscillation, and making the choice between the two modes, i.e., the rewriting of information, by a weak control voltage applied at the beginning of each building up period, making use of the superregenerative action.

Figure 10:
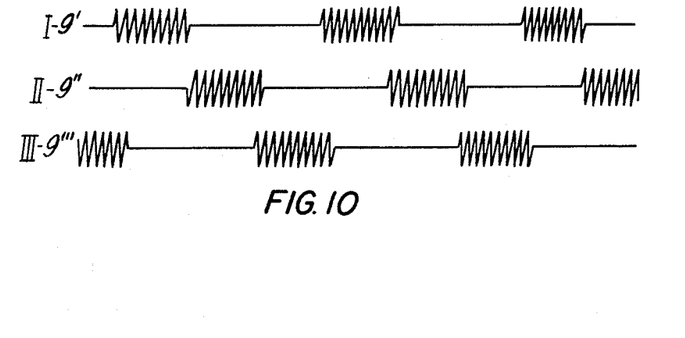
FIG. 10 is a diagram of the three beat excitation wave for exciting or synchronizing parametrons in group configurations.

Actually, this is done by modulating the exciting wave by a periodic wave which also serves as a clock pulse. Hence, for each parametron there is an alternation of active and passive periods, corresponding to the switching on and off of the exciting current. Usually, the parametron device uses three clock waves, labeled I, II and III, all having the same pulse recurrence frequency, but switched on and off after another in a cyclic manner with a partial time overlap as shown in FIG. 10. This method of exciting each of the parametrons in a digital system with either one of the three exciting waves I, II and III is usually called the "three beat" or the "three subclock" excitation and is later herein more fully described as applied to a delay line.

Figure 9:
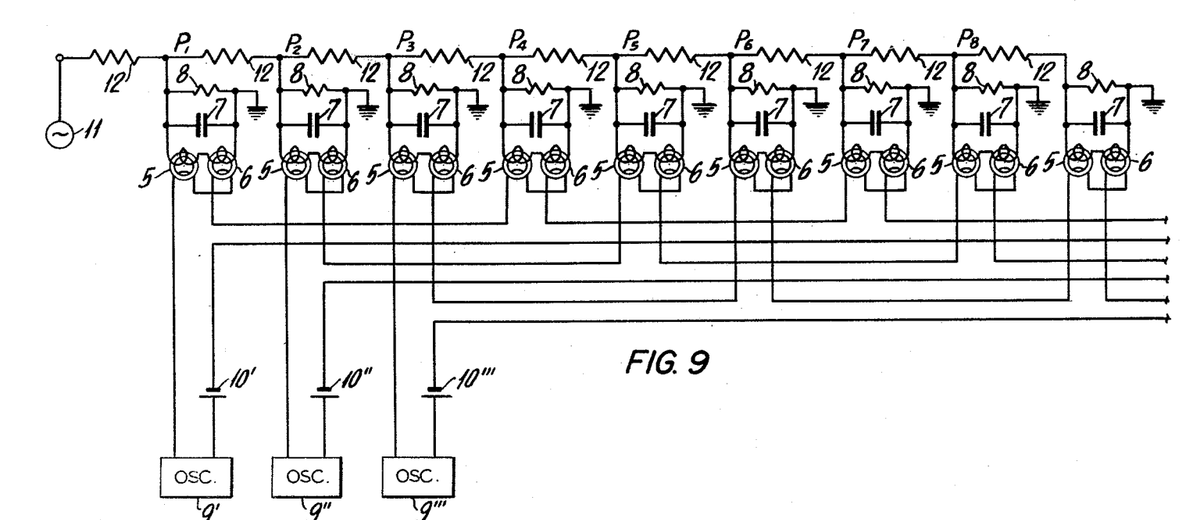
FIG. 9 is a diagram illustrative of how a delay line can be constructed using parametrons.

Digital systems can be constructed using parametrons by intercoupling parametron elements in different groups by a coupling element. The parametron is a synchronous device and operates in rhythm with the clock pulse. Each parametron can take in a new binary digit ("1" or "0") at the beginning of every active period, and transmit it to the parametrons of the next stage with a delay of one-third of the clock period. This delay can be used to form a delay line. FIG. 9 shows one such delay line which consists of parametrons simply coupled in a chain, each successive parametron element belonging each to the groups I, II, III, I, . . . . Hence, the phase of oscillation of a parametron in the succeeding stage will be controlled by that in the preceding stage, and a binary signal $x$ applied to the leftmost parametron will be transmitted along the chain rightwards in synchronism with the switching of the exciting currents. Hence, the circuit may be used as a delay line or a dynamic memory circuit.

The delay line consists of a plurality of parametrons $P_1$–$P_8$ each of which has a pair of cores 5, 6 and a resonant circuit comprising a capacitor 7 and a resistance 8 in parallel. It will be understood that for ease of understanding and to simplify the drawings the various parametrons will be shown as having the various components parts thereof designated by the same or corresponding reference numerals. The resonant circuits of the individual parametrons are series resistance coupled by a plurality of resistances each designated as a coupling resistance 12. A series oscillator 11 is resistance coupled through a coupling resistance as shown, to the resonant circuits of all of the parametrons $P_1$–$P_8$.

Time-sequencing or synchronizing signals which are exciting "three beat" waves are applied to the individual parametrons by a plurality of oscillators 9', 9" and 9''' and respective D.C. current sources 10', 10" and 10''' connected in series to the exciting or primary windings of the parametrons. These oscillators operate at a frequency $2f$ and their oscillation is intermittent, as shown in FIG. 10, so that the exciting waves emitted have a partial time overlap. As illustrated the oscillator 9' is connected in series with the primary coils of the parametrons $P_1$, $P_4$, $P_7$ the oscillator 9" is in series with the primary coils of the parametrons $P_2$, $P_5$ and $P_8$; and the oscillator 9''' is in series with the primary coils of the parametrons $P_3$, $P_6$, $P_9$ respectively. It can therefore be seen that the parametrons can be thought of as being connected in three groups the clock or synchronizing waves (FIG. 10) are labeled I, II and III correspond to the individual oscillators generating them and correspond to a respective group of parametrons.

For purpose of the example it is assumed that the alternating and direct currents are both limited to approximately one ampere. In a series connection of the parametrons as that disclosed in FIG. 9 if a very weak oscillation having a frequency 1 mc./s. with a phase representative of the binary digit "0" is applied by the oscillator 11 to the resonant circuit of the parametron $P_1$ and if the oscillators 9', 9" and 9''' and the D.C. sources connected as shown an oscillation having a frequency 1 mc./s. is generated in the resonant circuit of the parametron $P_1$ when it is excited by the oscillator 9' and the phase of the oscillation in this parametron is determined by that of the phase of the input oscillator 11 or rather the phase of its output signal and the amplitude of the oscillations increases as described heretofore and then assumes a stabilized state.

The oscillation or oscillating voltage in parametron $P_1$ is transmitted or transferred to the resonant circuit of the parametron $P_2$ through the respective coupling resistor 12. This output of parametron $P_1$, therefore, is the control input to the parametron $P_2$ so that when the exciting wave is applied to parametron $P_2$ by its respective exciting oscillator 9" a subharmonic oscillation is developed in the resonant circuit with the phase corresponding to the input from the parametron $P_1$. The oscillating voltage from parametron $P_2$ is transferred to parametron $P_3$ through its respective coupling resistor 12 so that when the exciting wave or current of oscillator 9''' is impressed on parametron $P_3$ the phase of the oscillation of the resonant circuit corresponds to that of the input from the input oscillation from $P_2$. It follows that the phase condition of the input oscillator 11, which for purposes of example has been designated as corresponding to the binary digit "0," is communicated or transmitted from $P_1$ to $P_2$, $P_3$, $P_4$, $P_5$, etc. successively with a time delay. Thus, it is readily apparent that logical operations can be performed by the use of parametrons.

It should be remembered that the effective phase control signal acting on a given parametron can correspond to the algebraic sum of the outputs of three or more parametrons and that parametrons can operate by majority principle so that the input to a single parametron for controlling the phase of the oscillation thereof can be determined according to the majority of three binary-coded signals, $x$, $y$ and $z$ respectively represented by the oscillation modes of three input parametrons. It is only necessary that an odd number of inputs be employed and at present an allowable number of inputs is three or five in most cases. Thus the majority operation of parametrons outlined heretofore includes the basic logical operations "and" and "or."

Figures 11, 12, 14, 15, 16, 18, 19:
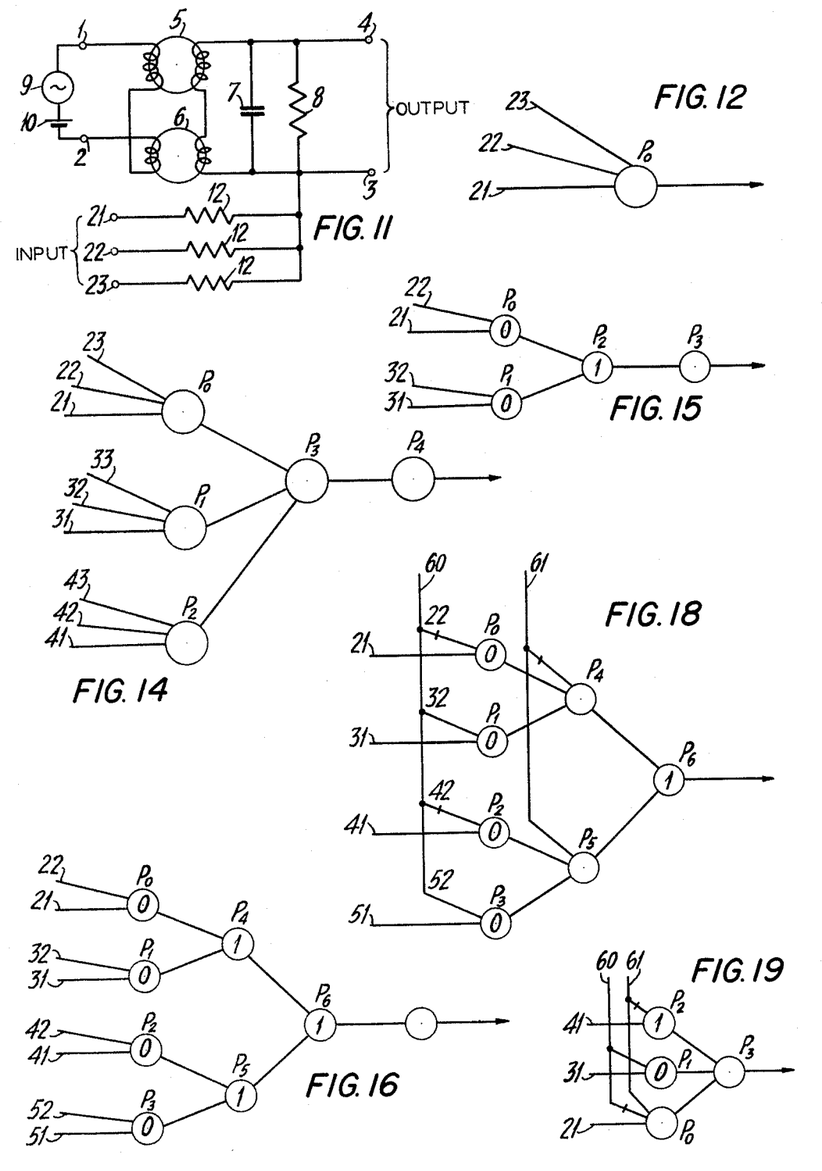
FIG. 11 is a schematic diagram of a gating element or parametron according to the invention.
FIG. 12 is a symbolic diagram of a gating element of FIG. 11.
FIG. 14 is a symbolic diagram of the circuit shown in FIG. 13.
FIG. 15 is a symbolic circuit diagram of a gate arrangement in which one of the control inputs to each of the gating parametrons of the first and second stages of the gate has a constant value applied thereto.
FIG. 16 is a symbolic circuit diagram for handling four inputs and in which one of three inputs or one of the control inputs is a constant value.
FIG. 18 is a symbolic diagram of the circuit shown in FIG. 17.
FIG. 19 is a symbolic circuit diagram of another embodiment of the invention in which common inputs are applied to the gating parametrons in conjunction with signal inversion and constant values of binary conditions.

Referring now to the present invention, FIG. 11 is a schematic diagram of the basic parametron circuit according to the invention and usable in the gate configurations hereinafter described. The basic gating element is comparable to the parametron described heretofore with respect to FIG. 6. The windings thereof are on cores herein designated 5, 6 and a resonant circuit comprising a capacitor 7 and a resistance 8 in parallel is provided. It will be understood that for ease of understanding hereinafter and to simplify the drawings and specification the various parametrons in the several gate circuits to be described will be shown as having the various components thereof designated by the same or corresponding reference numerals.

An exciting current is applied at input terminals 1, 2 and is a superposition of a radio frequency current of frequency 2f, from a source 9 and a D.C. bias from D.C. source 10 as applied to the primary windings as heretofore disclosed. However, the gating element or basic gating parametron of the invention is provided with three inputs applied along parallel paths or terminals 21, 22, 23 through respective coupling resistances 12, as shown. The input information which is binary-coded to be transferred as an output by the apparatus according to the invention is applied at terminal 21 and binary-coded control inputs are applied at the other terminals 22, 23. It should be noticed that an even number, for example, two control inputs are applied. Assuming that the information or data applied to terminal or path 21 is a binary condition or digit "1" the signal representative thereof has a phase of 180°. Then the phase in the resonant circuit of the parametron is representative of a binary digit "0" when both control inputs are binary condition "0" so that the input information applied to terminal 21 cannot be remembered in the parametron. However, if the control inputs applied at the control terminals 22 and 23 have phases representative of values of conditions "0" and "1" respectively, the phase of the oscillation in the resonant circuit is 180° so that the output signal or its phase thereof is representative of binary digit "1." In this case the input information from terminal 21 is remembered in the parametron and then is picked up from the output side to be communicated to a next stage of the gating arrangement as hereinafter described. It should be remembered that this gating element functions on a majority principle as to its inputs.

Since the complete apparatus consists of several parametrons networks of parametrons are conveniently described by schematic or symbolic diagrams, a short summary of which follows in order to understand the symbolic diagrams. Each parametron is represented by a small circle as shown in FIG. 12, which is a symbolic diagram of the circuits shown in FIG. 11. In the symbolic diagrams hereinafter referred to each parametron is represented by a small circle and the circles are connected by a line if corresponding parametrons are coupled, one line is used per unit coupling intensity. When applicable a double line between circuits, not shown, indicates that both parametrons are coupled in double intensity. A short bar (+) across any coupling line denotes complementation, that is, both parametrons are coupled with reverse polarity. Otherwise, it is understood they are coupled with the same polarity. If not specified parametrons are supposed to be excited with the three beat excitation described heretofore. It follows, therefore, that only parametrons belonging to different groups (I, II, III) as heretofore described, can be coupled, and the information is transmitted along these lines always in the direction: I→II, II→III, III→I.

It can be seen that each coupling line has a direction of transmission and to show this direction usually the output lines from a parametron will come from the right side of a circle and go to the left side of another circle as an input to it. As will be explained hereinafter a special parametron called a constant parametron can be allowed to hold a certain condition corresponding to a respective binary digit of notation and can serve as a phase reference. It is standard practice in symbolic diagrams that lines are omitted from the diagrams on the constant parametrons in order to avoid complication. Moreover, in the drawings in order to specifically designate the oscillation phase of particular parametrons corresponding to the digits ("0" and "1") phase conditions will be inscribed in the circles in order to designate the phase condition or binary value corresponding thereto.

According to FIG. 12, the parametron of FIG. 11 is designated P0 and the inputs corresponding to terminals 21, 22 and 23 are applied thereto as shown.

Figure 13:
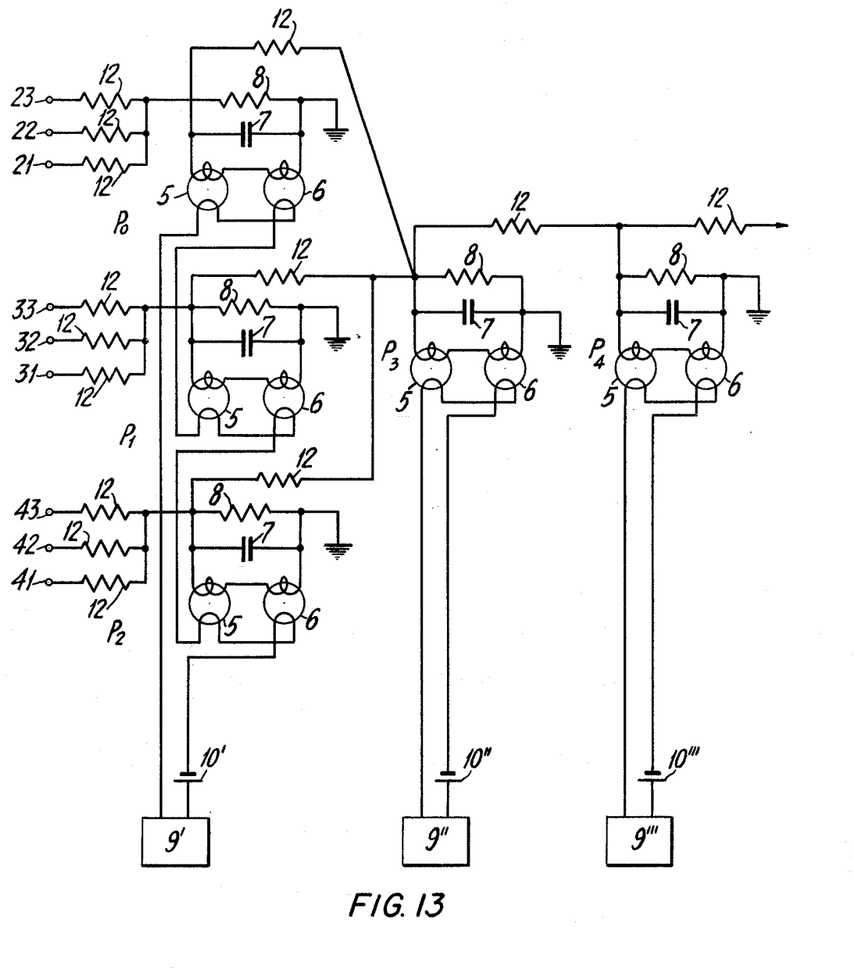
FIG. 13 is a schematic diagram of a gate circuit for selectively transferring one of three binary-coded information or data inputs.

A gate circuit according to the invention is formed by using a plurality of parametrons of the type heretofore described with respect to FIGS. 11 and 12 arranged in various configurations. In FIG. 13 a data-transfer gate arrangement, for selectively transferring any one of three information inputs, is shown in which a first stage of the apparatus consists of gating parametrons P0, P1, P2 in parallel with the resonant circuits of the parametrons P1, P2, series coupled through coupling resistances 12. It will be understood that in order to simplify the drawings and the disclosure the various resistance couplings of the circuits shown in FIG. 13 and other circuits will be referred to as resistances 12 and each resistance so designated is a series resistance coupling element.

The resonant circuit of one parametron P0 is in cascade with a second stage of the apparatus consisting of a parametron P3 which has its resonant circuit in cascade with the resonant circuit of a single output parametron P4. The parametrons of the various stages are excited by three beat excitation sources 9', 9" and 9''' in conjunction with D.C. sources 10', 10" and 10''' in the manner heretofore disclosed. The primary windings to which the exciting frequency 2f of the parametrons in the first stage is applied are series connected. To each of the resonant circuits of the gating parametrons receptive of the data or information to be transferred is connected three inputs in parallel. The parametron P0 is provided with input terminals 21, 22, 23 while the parametron P1 is provided with input terminals 31, 32 and 33 and the first stage gating parametron P2 is provided with input terminals 41, 42, 43. In each instance the input terminals are series coupled through series resistances 12 to the resonant circuits of the respective gating parametrons as shown.

In order to transfer the input information of the parametron P0 to the output parametron P4 it is necessary that the two control inputs applied to terminals 22 and 23 of a gating parametron P0 are oscillations of different phases representative of two different binary digits or conditions. Moreover, the two control inputs of parametrons P1 and P2 applied to terminals 31 and 32 and 42, 43 respectively are of the same binary value and the signals applied at terminals 32, 33 and 42, 43 are of different values. Assuming, for example, that the input information applied to terminal 21 is representative of binary digit "1" and the input information applied to terminals 32 and 41 is representative of binary digit "0" and "1" respectively, the control input applied to terminals 22 and 23 are of mutually different values, therefore, an oscillation having a phase coincident with that of the information from terminal 21 is induced in the resonant circuit of the gating parametron P0 when exciting current is applied thereto by the oscillator 9'. It follows that the information applied to terminal 21 is stored in parametron P0.

Now assuming that the control inputs applied to the parametron P1 are of the same value "1" then the parametron P1 will when excited by the oscillator 9' oscillate with a phase representative of a binary condition different from that of the input information from terminal 31 and if the control inputs applied to the gating parametron P2 are assumed to be the same value "0"

the phase of oscillation in its resonant circuit of parametron P2 will correspond to that of the two control inputs and differ from the input information "1" applied at terminal 41. In other words, while the exciting currents are being applied to the first stage gating parametrons P0, P1 and P2, the gating parametron P0 has the phase 180° representative of the binary digit "1" of terminal 31; the parametron P1 has an oscillation whose phase is different from the information or signal "0" from terminal 31 and P2 has an oscillation with a phase of 0° different from the information "1" from terminal 41. This information is applied in parallel to the resonant circuit of the parametron P2 through the series coupling resistance. In this last described case, the output from the parametron P0 corresponds to the information input to the parametron P3 and the outputs from the parametrons P1 and P2 correspond to the two control inputs.

When exciting current is applied to the gating parametron P3 by the oscillator 9″, the values of the control inputs from the parametrons P1 and P2 are different from each other, so that the oscillation generated in the resonant circuit of the parametron P3 is according to the information input value from the parametron P0 and the phase of the oscillation is 180°.

Only the output from the second stage gating element or parametron P3 is applied to the output parametron P4, so that when the output parametron P4 is excited by the oscillator 9‴ it will oscillate with the same phase as that of the oscillation in the second stage gating parametron P3, namely, the information applied to the parametron P0 through terminal 21 can be transferred to the parametron P5. In the same way, transfer of only the input information applied to path 31 to the gating parametron P4 is possible by using different values for terminals 32 and 33, the same values for terminals 22, 23, and 42, 43, and different values for the terminals 22 and 42, respectively. The circuit illustrated in FIG. 13 is drawn in FIG. 14 by means of the abbreviated symbols, namely, the parametrons P0, P1, P2, P3 and P4 are shown by the circles respectively, and the control and information inputs coincide with those in FIG. 13.

FIG. 15 is illustrative of a gate circuit in abbreviated symbols in which one out of an even number of control inputs in each gating parametron P0, P1, P2 is assumed to be a constant value. The arrangement has two gating parametrons P0, P1 in a first stage in cascade with a second stage gating parametron P2 which applies its output as a control input to a series output parametron P3. In the illustration, a terminal normally designated 23, not shown, one of the control input terminals 22 and 23 of the parametron P0, and a terminal 33, not shown, one of the control inputs 32 and 33 of parametron P1 have the constant value "0" so that the code "0" is inside the circle representing the parametron element. It will be remembered that when constant values are applied a symbolic diagram does not show the input except as designated internally of the circle corresponding to the parametron. It is assumed that the control input of a constant value "1" is applied to a second stage gating parametron P2, and so the value "1" is shown inside the circle representing the second stage parametron element. Excitation of the first stage gating parametrons P0 and P1 is carried out by an oscillator which is not illustrated in FIG. 15 nor is that of the parametron P2 and that of the parametron P3. Such means of excitation are of the three beat type shown in the circuits which have been heretofore explained. In this case, if terminals 22 and 32 are assumed to take conditions "1" and "0" respectively, in order to pick up only the input information terminal 21, the same value as that of terminal 21 is remembered in the gating parametron P0 and the value "0" independent of the value of terminal 21 is remembered in the other first stage parametron P1, when the exciting currents are applied to the gating parametrons P0 and P1. As the control inputs to the parametron P2 are the values "0" and these two cancel out each other, the input information, i.e., the input from the parametron P1, is remembered in parametron P2 without modification. Consequently, the output parametron P3 can, when excited by its respective oscillator, not shown, remember the information of terminals 21, 31, which can be picked up selectively, if 22=0 and 32=1.

The embodiment of FIG. 16 illustrates the case in which one constant value is applied to each gating parametron. Four parametrons P0, P1, P2, P3 form the first stage, and thus the four input information signals can be picked up selectively. Here the control inputs including one constant value "0" is applied to each of the parametrons P0, P1, P2, and P3 in the first stage, and the constant value "1" and the control inputs including the constant value "1" are applied respectively to the two gating parametrons P4 and P5 in the second stage and parametron P6 in the third stage. The first stage parametrons P0, P1, P2, P3 are provided with input terminals 21, 22, 31, 32, 41, 42, 51, 52 respectively. For ease of understanding the invention the control inputs are hereinafter set forth in tabular form and designated by a reference number corresponding to the terminal or path by which they are applied.

Combinations of the codes or values of the control inputs 22 32, 42, and 52 are shown in Table 1 which is described below.

*Table 1*

|    |   |    |    |    |    |
|----|---|----|----|----|----|
| 22 | 0 | 1  | 0  | 0  | 0  |
| 32 | 0 | 0  | 1  | 0  | 0  |
| 42 | 0 | 0  | 0  | 1  | 0  |
| 52 | 0 | 0  | 0  | 0  | 1  |
| P0 | 0 | 21 | 0  | 0  | 0  |
| P1 | 0 | 0  | 31 | 0  | 0  |
| P2 | 0 | 0  | 0  | 41 | 0  |
| P3 | 0 | 0  | 0  | 0  | 51 |
| P4 | 0 | 21 | 31 | 0  | 0  |
| P5 | 0 | 0  | 0  | 41 | 51 |
| P6 | 0 | 21 | 31 | 41 | 51 |

In other words a combination of 22="1," 32, 42, and 52="0" and that of 32="1" 22, 42, and 52="0" enable the selective pickup of the input information of terminals 21 and 31 respectively from the parametron P3. In the similar way, it is possible to pick up the input information of a given parametron by making the binary digit values of the two control inputs to it different from each other.

Figure 17:
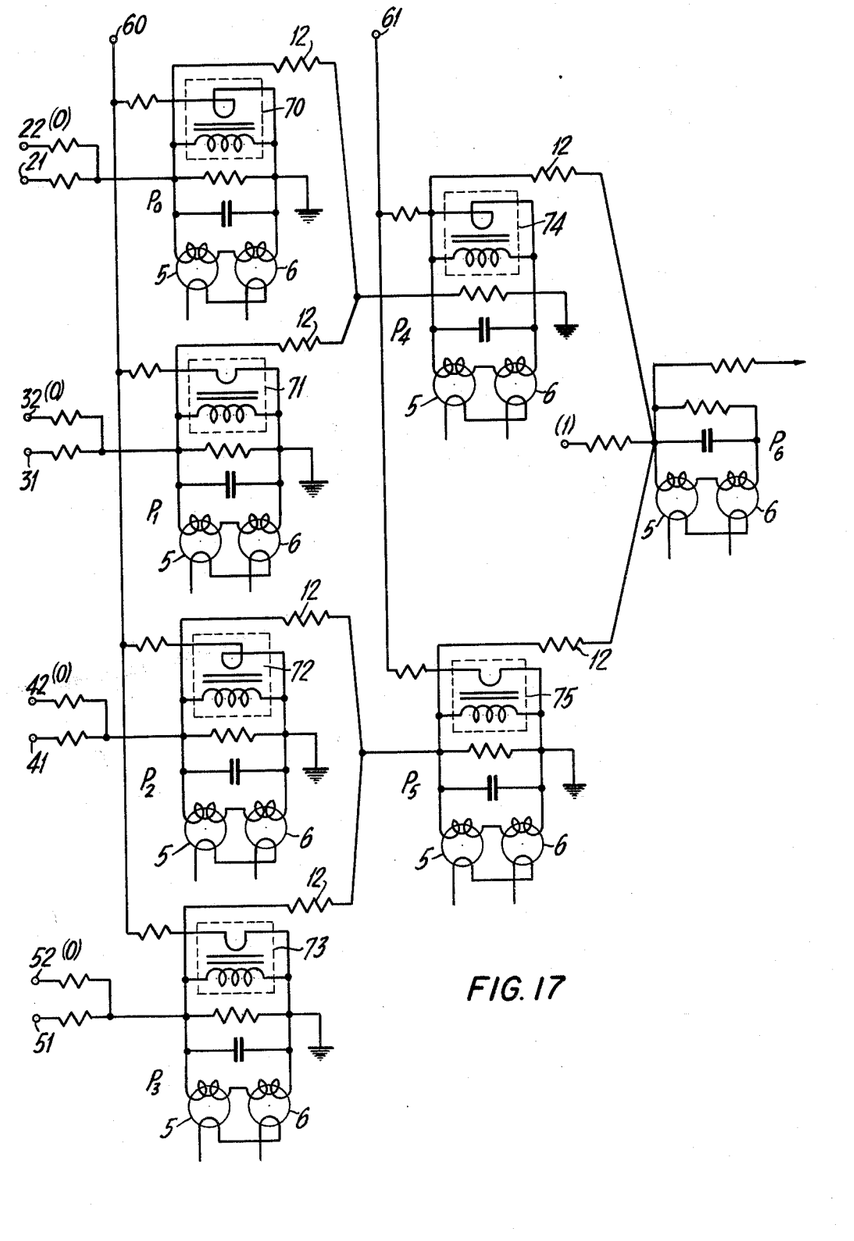
FIG. 17 is a schematic circuit diagram of a gate illustrative of an arrangement in which common control inputs are applied to the gating parametrons of the parallel stages and is illustrative of inversion or complementation techniques according to the present invention.

In another embodiment of the invention shown in FIGS. 17 and 18 four gating parametrons P0, P1, P2, P3 are arranged in a first stage in parallel. Two of the parametrons P0, P1 have their resonant circuits coupled through coupling resistances 12 in parallel as inputs to the resonant circuit of a second stage parametron P4. The other first stage parametrons P2, P3 have their resonant circuits resistance coupled in parallel through other coupling resistances 12 to the resonant circuit of a second stage gating parametron P5 having its resonant circuit resistance coupled in parallel with the resonant circuit of the other second stage gating element P4 as inputs to the resonant circuit of a third stage output parametron P6.

It will be understood that the exciting windings of the parametrons in the respective first and second stages are connected in series with respective oscillators and D.C. sources, not shown, for periodic excitation thereof as heretofore described. The output parametron P6 is excited separately periodically as a separate stage by its excitation source, not shown. The first stage parametrons P0, P1, P2, P3 are provided with parallel inputs through parallel paths or terminals 21, 22; 31, 32; 41, 42; 51, 52, respectively and a common parallel control input path or terminal 60 resistance coupled to the resonant circuit of all the first stage parametrons. A control path or terminal 61 is resistance coupled to both of the second stage parametrons in parallel with the other cascade connections from the first stage parametrons. Both the common inputs 60, 61 are applied to transformers in the resonant circuits of the respective parametrons as hereinafter described.

In FIG. 17, the constant values "0" and "1" are applied to each parametron in a first stage and an output parametron P6 in a third stage respectively as one of the control inputs. The other control input to each parametron in the first stage is applied across the common terminal 60, and the values of the control inputs to the parametrons P0 and P2 are reversed (FIG. 18) as later explained. In the same way, one control input to each parametron in the second stage is applied from the common terminal 61, and the control input to P4 is reversed. In order to carry out such reversals of values the control inputs obtained from the terminals 60 and 61 pass through transformers 71, 75, in which the winding of the primary coils of 70, 72 and 74 are counter to that of the primary coils of the others 71, 73, 75. Consequently, when the control input of the value "1" is applied to the terminals 60 for example, it is communicated to P0 and P2 as the value "0" and the control input of the value "1" is communicated to P1 and P3 without modification. Furthermore, the first digits on the binary scale can be represented by the terminals 60 and 61, so that in the present example that the input information is selected by the change of the first two digits on the binary scale.

The input information oscillations in this circuit are applied to terminals 21, 31, 41, and 51 of the parametrons P0, P1, P2 and P3 respectively, and the control inputs are applied at terminals 22, 32, 42, and 52, but in this example every control input has the constant value "0."

FIG. 18 illustrates the circuit in FIG. 17 in abbreviated symbols for easier understanding of its operation, where the signal phase or binary digit reversals are shown by the the sign (÷) and the control input of the constant value to each parametron is shown by the value or digit "0," or "1" written inside the circle representing the parametron. In this circuit, the information at 21, 31, 41 and 51 can be picked up respectively, when 60=0; 61=0; 60=1, 61=1; 60=0, 61=1; and 60=1, 61=1, as is shown in Table 2.

*Table 2*

| | | | | |
|---|---|---|---|---|
| 60 | 0 | 1 | 0 | 1 |
| 61 | 0 | 0 | 1 | 1 |
| P0 | 21 | 0 | 21 | 0 |
| P1 | 0 | 31 | 21 | 31 |
| P2 | 41 | 0 | 41 | 0 |
| P3 | 0 | 51 | 0 | 51 |
| P4 | 21 | 31 | 0 | 0 |
| P5 | 0 | 0 | 41 | 51 |
| P6 | 21 | 31 | 41 | 51 |

In FIG. 19 input information terminals 21, 31, and 41 are provided on gating parametrons P0, P1, and P2 respectively forming a first stage. One control input, on a terminal not shown, applied to parametron P0 has the constant value "1," a control input, on a terminal not shown, to parametron P1 has the constant value and the control input on a terminal 60 is common to the parametrons P0 and P2, and the latter is provided with the reverse value. A control input terminal 61 is common to parametrons P1 and P2 which is applied with a reversed value. In this example the input information can be picked up selectively by the change of the binary scale digits. An output parametron P3 in the second stage is provided with the output from the parametrons in the first stage. In this case the process of selective pickup of the information applied on paths or terminals 21, 31, and 41 is made clear by the following Table 3.

*Table 3*

| | | | |
|---|---|---|---|
| 60 | 0 | 1 | 0 |
| 61 | 0 | 0 | 0 |
| P0 | 21 | 0 | 1 |
| P1 | 0 | 31 | 0 |
| P2 | 1 | 1 | 41 |
| P3 | 21 | 31 | 41 |

Figure 20:
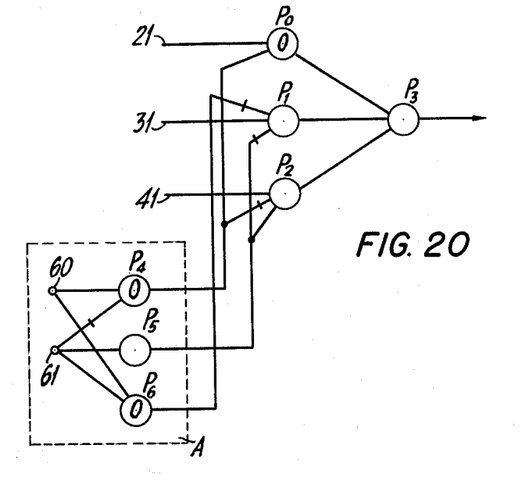
FIG. 20 is a simplified symbolic circuit diagram for transmission or gating of one of three inputs and is illustrative of an embodiment in which control of the selection of the transfer of the information inputs is accomplished by control input generating apparatus.

FIG. 20 shows another method of selectively picking up three parallel information inputs that are applied to first stage parametrons P0, P1 and P2 through paths 21, 31, and 41 and the control inputs to be applied to these parametrons are generated by a control input generating apparatus A which is separate. The control input apparatus comprises three parallel parametrons P4, P5, and P6 having their respective resonant circuits, not shown, coupled to the resonant circuits, not shown, of the first stage parametrons in the manner shown symbolically. In this case the control inputs applied to the parametrons P0, P1 and P2 are changed by control inputs applied at 60 and 61 to the control parametrons P4, P5 and P6, and the process of the selective pickup of the input information, for transmission from output parametron P3 is shown by the conditions and combinations of the following Table 4.

*Table 4*

| | | | | |
|---|---|---|---|---|
| 60 | 0 | 1 | 0 | 1 |
| 61 | 0 | 0 | 1 | 1 |
| P4 | 0 | 1 | 0 | 0 |
| P5 | 0 | 0 | 1 | 1 |
| P6 | 0 | 0 | 1 | 1 |
| P0 | 0 | 21 | 0 | 1 |
| P1 | 1 | 1 | 31 | 0 |
| P2 | 41 | 0 | 1 | 1 |
| P3 | 41 | 21 | 31 | 0 |

Figure 21:
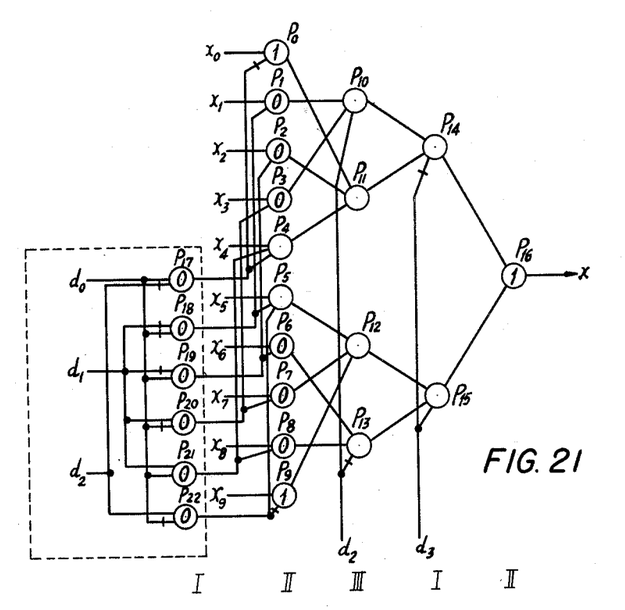
FIG. 21 is a symbolic diagram of a circuit for handling ten information inputs and selection of one is accomplished by excess-three code techniques.

Fig. 21 is illustrative of a circuit by which one of the ten input information bits or data inputs $x1$, $x2$, $x3$ . . . and $x9$ can be selected by excess-3-codes. The excess-3 codes represent decimal figures by means of the control inputs $d_0$, $d_1$, $d_2$, and $d_3$, as indicated on the following Table 5:

*Table 5*

| | $d_3$ | $d_2$ | $d_1$ | $d_0$ |
|---|---|---|---|---|
| 0 | 0 | 0 | 1 | 1 |
| 1 | 0 | 1 | 0 | 0 |
| 2 | 0 | 1 | 0 | 1 |
| 3 | 0 | 1 | 1 | 0 |
| 4 | 0 | 1 | 1 | 1 |
| 5 | 1 | 0 | 0 | 0 |
| 6 | 1 | 0 | 0 | 1 |
| 7 | 1 | 0 | 1 | 0 |
| 8 | 1 | 0 | 1 | 1 |
| 9 | 1 | 1 | 0 | 0 |

In this embodiment parallel paths of information inputs $x_0$, $x_1$, . . ., and $x_9$ are connected to a stage of parallel gating parametrons P0, P1, . . ., and P9. A plurality of control parametrons P17, P18, . . . and P22 coupled to the gating parametrons as shown are controlled by control inputs $d_0$, $d_1$ and $d_2$ respresenting the excess-3 codes, and two stages of gating parametrons P10, P13, P14 and P15 in cascade with the first-mentioned plurality of gating parametrons, are also controlled by control inputs $d_2$ and $d_3$. A constant value "1" is applied to parametron P0, P9 and an output parametron P16 and a control input of the constant value "0" parametrons is applied to each of the parametrons P1–P8 and P17–P22. The process of selection of one out of the ten information inputs $x_0$–$x_9$ by means of the excess-3 codes $d_0$, $d_1$, $d_2$ and $d_3$ will be made clear by the following Table 6.

Table 6

|     | 0 | 1 | 2 | 3 | 4 | 5 | 6 | 7 | 8 | 9 |
|---|---|---|---|---|---|---|---|---|---|---|
| $d_0$ | 1 | 0 | 1 | 0 | 1 | 0 | 1 | 0 | 1 | 0 |
| $d_1$ | 1 | 0 | 0 | 1 | 1 | 0 | 0 | 1 | 1 | 0 |
| $d_2$ | 0 | 1 | 1 | 1 | 1 | 0 | 0 | 0 | 0 | 1 |
| $d_3$ | 0 | 0 | 0 | 0 | 0 | 1 | 1 | 1 | 1 | 1 |
| $P_{17}$ | 1 | 0 | 0 | 0 | 0 | 0 | 1 | 0 | 1 | 0 |
| $P_{18}$ | 0 | 1 | 0 | 0 | 0 | 1 | 0 | 0 | 0 | 1 |
| $P_{19}$ | 0 | 0 | 1 | 0 | 0 | 0 | 1 | 0 | 0 | 0 |
| $P_{20}$ | 0 | 0 | 0 | 1 | 0 | 0 | 0 | 1 | 0 | 0 |
| $P_{21}$ | 1 | 0 | 0 | 0 | 1 | 0 | 0 | 0 | 1 | 0 |
| $P_{22}$ | 0 | 1 | 0 | 1 | 0 | 0 | 0 | 0 | 0 | 1 |
| $P_0$ | $x_0$ | 1 | 1 | 1 | 1 | 1 | $x_0$ | 1 | $x_0$ | 1 |
| $P_1$ | 0 | $x_1$ | 0 | 0 | 0 | $x_1$ | 0 | 0 | 0 | $x_1$ |
| $P_2$ | 0 | 0 | $x_2$ | 0 | 0 | 0 | $x_2$ | 0 | 0 | 0 |
| $P_3$ | 0 | 0 | 0 | $x_3$ | 0 | 0 | 0 | $x_3$ | 0 | 0 |
| $P_4$ | 1 | 0 | 0 | 0 | $x_4$ | 0 | $x_4$ | 0 | 1 | 0 |
| $P_5$ | 0 | 1 | 0 | $x_5$ | 0 | $x_5$ | 0 | 0 | 0 | 1 |
| $P_6$ | 0 | 0 | $x_6$ | 0 | 0 | 0 | $x_6$ | 0 | 0 | 0 |
| $P_7$ | 0 | 0 | 0 | $x_7$ | 0 | 0 | 0 | $x_7$ | 0 | 0 |
| $P_8$ | $x_8$ | 0 | 0 | 0 | $x_8$ | 0 | 0 | 0 | $x_8$ | 0 |
| $P_9$ | 1 | $x_9$ | 1 | $x_9$ | 1 | 1 | 1 | 1 | 1 | $x_9$ |
| $P_{10}$ | 0 | $x_1$ | 0 | $x_3$ | 0 | 0 | 0 | 0 | 0 | $x_1$ |
| $P_{11}$ | $x_0$ | 0 | $x_2$ | 0 | $x_4$ | 0 | (*) | 0 | $x_0$ | 0 |
| $P_{12}$ | 0 | $x_9$ | 0 | (*) | 0 | $x_5$ | 0 | $x_7$ | 0 | $x_9$ |
| $P_{13}$ | $x_8$ | 0 | 0 | 0 | 0 | 0 | $x_6$ | 0 | $x_8$ | 0 |
| $P_{14}$ | $x_0$ | $x_1$ | $x_2$ | $x_3$ | $x_4$ | 0 | 0 | 0 | 0 | 0 |
| $P_{15}$ | 0 | 0 | 0 | 0 | 0 | $x_5$ | $x_6$ | $x_7$ | $x_8$ | $x_9$ |
| $P_{16}$ | $x_0$ | $x_1$ | $x_2$ | $x_3$ | $x_4$ | $x_5$ | $x_6$ | $x_7$ | $x_8$ | $x_9$ |

*Indefinite value.

The transfer of information inputs $x_1$ and $x_2$ are determined by $x_5$, $x_7$, $x_9$; and $x_0$, $x_2$, $x_4$ respectively, and each corresponds to the valve "0" or "1."

It can be readily understood that various switching apparatus as heretofore described are capable of picking up selectively one out of a plurality of information or data inputs can be easily formed by using a fundamental gating element according to this invention as shown in FIG. 11.

While preferred embodiments of the invention have been shown and described it will be understood that many modifications and changes can be made within the true spirit and scope of the invention.

What I claim and desire to secure by Letters Patent is:

1. In a data-transfer gate arrangement in combination, an output parametrically excited resonator, at least a first and second stage of gating parametrically excited resonators in cascade, said first stage comprising a plurality of said resonators and said second stage comprising at least one parametrically excited resonator connected in cascade with said output resonator, means connecting resonators in said first stage connected to said second stage resonators in parallel, each of said resonators comprising an output resonant circuit having a resonance frequency $f$ and having means for varying the resonance frequency of said output resonant circuit, an exciting circuit for applying an exciting current of frequency $2f$, means coupling said exciting circuit to each of said output resonant circuits through said means for varying the resonance frequency to generate an oscillation having a frequency $f$ corresponding to a ½ subharmonic of said exciting frequency $2f$ and having one of two different phases which are displaced by 180 degrees from each other and representative respectively, of binary conditions "0" and "1," for each resonator in said first stage means for applying two control signals of frequency $f$ directly to said output resonant circuit, for each resonator in the first stage means for applying a binary-coded information input signal of frequency $f$ directly to said resonant circuit thereof, said control signals and information signal having one of said two different phases displaced by 180 degrees, said means for applying said two control signals and said information signal comprising an odd number of means for each resonator for applying said control and information signals in parallel in preselected combinations of said two different phases to cause the phase of said ½ subharmonic oscillation of frequency $f$ in said second stage resonator to be controlled by the phase of the majority of said control signals and said information signal when said ½ subharmonic oscillation is restarted after interruption, means for selectively applying an exciting current having a frequency $2f$ to said means for varying the resonant frequency of each one of said gating resonators and said output resonator to effect selective transmission of the binary information from a selected one of said information inputs of a selected one of said gating resonators of said first stage to said output parametrically excited resonator by selectively applying an exciting current to said gating resonators connected to said output resonator thereby controlling the oscillation phase of said one gating resonator slightly after said selective application of an exciting current to said one gating resonator to control the oscillation phase of said gating resonator receptive of a binary-coded information input to be transmitted, and means coupling the gating resonator of said second stage to said output parametrically excited resonator for applying the ½ subharmonic oscillation $f$ of the gating resonators to said outut parametrically excited resonator as the phase control signal thereof.

2. In a data-transfer gate arrangement comprising, in combination, a plurality of gating resonant circuits in a first and second stage in cascade, the gating resonant circuits in said first stage connected to said second stage being arranged in parallel, one output resonant circuit in cascade with said second stage, each resonant circuit having a resonance frequency of near $f$ and each including an input, an output and a variable reactance the value of which is a parameter determining the resonance frequency of said resonant circuits, means coupling the outputs of the gating resonant circuits with the output resonant circuit as inputs for varying the parameter of said output resonant circuit and the phase of the output thereof, means for varying said parameters of the gating resonant circuits comprising at least two alternating power supply circuits each having a frequency $2f$ and a source of bias, and means applying said $2f$ frequency from said power supply circuits to said variable reactances of the gating resonant circuits to vary the values of said reactances and thereby generate in said resonant circuits parametric oscillations having a frequency $f$, said power supply circuits being coupled to said resonant circuits in balanced bucking relationship so that said frequency $2f$ of the power supply circuits is not transmitted to said resonant circuits and the frequency $f$ of said resonant circuits is not transmitted back to said power supply circuits, for each of said gating circuits in said first stage means for applying oscillations of frequency $f$ to said gating resonant circuits comprising means to apply two phase control signals of one of two phases to the resonant circuits of the first stage, and a binary-coded information signal for causing the gating resonant circuits to have an output signal corresponding only to the desired phase signal corresponding to the information signal which is to be transmitted, said means for applying said control signals and information signal comprising an odd number of means for each resonator for applying said control and information signals in parallel in preselected combinations of said two different phases to cause the phase of said oscillations of frequency $f$ in said second stage to be controlled by the phase of the majority of said control signals and said information signal, whereby the output resonant circuit generates an output signal whose phase is under control of said gating resonant circuits.

3. In a data-transfer gate arrangement comprising, in combination, a plurality of gating resonant circuits in a first and second stage in cascade, the gating resonant circuits in said first stage being arranged in parallel, one output resonant circuit in cascade with said second stage resonant circuits, each resonant circuit having a resonance frequency of near $f$ and each including an input, an output and a variable reactance the value of which is a parameter determining the resonance frequency of said resonant circuits, means coupling the outputs of the gating resonant circuits with the output resonant circuit as inputs for varying the parameter of said output resonant circuit and the phase of the output thereof, means for varying said parameters of the gating resonant circuits comprising three alternating power supply circuits each having a frequency $2f$ and a source of D.C. bias, and means applying said $2f$ frequency from two of said power supply circuits to said variable reactances of the gating resonant circuits and from a third power supply circuit to said output resonant circuit to vary the values of said reactances and thereby generate in said resonant circuits parametric oscillations having a frequency $f$, said power supply circuits being coupled to said resonant circuits in balanced bucking relationship so that said frequency $2f$ of the power supply circuits is not transmitted to said resonant circuits and the frequency $f$ of said resonant circuits is not transmitted back to said power supply circuits, for each of said gating circuits in said first stage means for applying oscillations of frequency $f$ to said gating resonant circuits comprising means to apply two phase control signals having one of two phases to the resonant circuits of the first stage, and a binary-coded information signal for causing the gating resonant circuits to have an output signal corresponding only to the desired phase signal corresponding to the information signal which is to be transmitted, whereby the gated resonant circuit generates an output signal under control of said gating resonant circuits.

4. In a data-transfer gate arrangement in combination, at least one output parametron, first and second stages of gating parametrons connected in cascade and in cascade with said output parametron for controlling the output of said output parametron, said gating parametrons each comprising a resonant output circuit having means connected for generating in operation an output oscillation signal having a predetermined resonance frequency and one of two different predetermined phases with a phase displacement of 180 degrees from each other with said phases corresponding to conditions "0" and "1," means for selectively applying to the resonant circuit of each parametron an exciting signal having a frequency of twice the resonance signal, means in each parametron for coupling said exciting signal applying means to the resonant output circuit thereof, means for applying phase control signals to the resonant output circuit of each gating parametron to determine the conditions "0" and "1" of an output oscillation to generate desired oscillations of the gating parametrons only when a predetermined combination of control signals is applied thereto, said phase control signals having one of two selected phases, said two different phases corresponding to conditions "0" and "1," and means for selectively applying a given combination of information signals to the resonant circuit of the individual gating parametrons individually and simultaneously to cause them to generate an output signal and thereby apply one output signal to the output parametron causing it to generate its output signal under control of said gating parametrons and corresponding to a preselected information signal determined by the phases of the information signals and phase control signal combinations applied to said gating parametrons.

5. A data-transfer apparatus comprising, a first plurality of resonant circuits and at least a second resonant circuit in cascade therewith and an output resonant circuit in cascade with said second resonant circuit, means for applying an odd number of respective inputs to at least respective ones of said first plurality of resonant circuits simultaneously along respective parallel paths representative of binary-coded data and information, each resonant circuit having a resonant frequency of near $f$ and each including an input, an output and a variable reactance the value of which is a parameter determining the resonant frequency of said resonant circuit, said first plurality of resonant circuits and second resonant circuit being coupled to each other with the output of at least some of the preceding resonant circuits being coupled to the input of the succeeding resonant circuit, means for varying said parameters comprising at least three alternating power supply circuits each having a frequency $2f$, means applying said $2f$ frequency from one of said power supply circuits to said variable reactances in said first plurality of resonant circuits and applying said frequency $2f$ from a second one of said power supply circuits to the variable reactances in said second resonant circuit and from a third power supply circuit to said output resonant circuit to vary the values of said reactances and thereby generate in said resonant circuits parametric oscillations having a frequency $f$ and one of two phases differing by 180 degrees from each other, means coupling each of said power supply circuits to respective ones of said resonant circuits in balanced bucking relationship so that said frequency $2f$ of the power supply circuits is not transmitted to said resonant circuits and the frequency $f$ of said resonant circuits is not transmitted back to said power supply circuits, and means for controlling each of said power supply circuits for interrupting the oscillations of frequency $f$ in preceding circuits at a time just after the parametric oscillations are generated in the succeeding resonant circuits, and means connected to at least said first plurality of resonant circuits to apply an even number of binary-coded phase control inputs to the individual resonant circuits of said first plurality to control the phase of the oscillations in said resonant circuits to cause them to apply a preselected phase control input to said output resonant circuit in dependence upon the combination of binary-coded information data inputs and phase control inputs to said first plurality of resonant circuits, whereby binary digits are represented by respective phases of the parametric oscillations and the phase of preselected combinations of the frequency $f$ generated in preceding resonant circuits control the phase of the frequency $f$ generated in subsequent resonant circuits and the oscillations generated in the subsequent resonant circuits is maintained even after the oscillations in the preceding resonant circuits are interrupted, and the phase of the output oscillation of said output resonant circuit is representative of a preselected one of the binary digit parallel inputs applied to said first plurality of resonant circuits.

6. A data-transfer apparatus comprising, a first plurality of resonant circuits and at least a second plurality of parallel resonant circuits in cascade therewith and an output resonant circuit in cascade with said second plurality of resonant circuits, means for applying an odd number of respective inputs to respective ones of said first and second pluralities of parallel resonant circuits simultaneously along respective parallel paths representative of binary-coded data and information, each resonant circuit having a resonant frequency of near $f$ and each including an input, an output and a variable reactance the value of which is a parameter determining the resonant frequency of said resonant circuit, said first and second pluralities of resonant circuits being coupled to each other with the output of at least some of the preceding resonant circuits being coupled to the input of respective succeeding resonant circuits, means for varying said parameters comprising at least three alternating power supply circuits each having a frequency $2f$, means applying said $2f$ frequency from one of said power supply circuits to said variable reactances in said first plurality of resonant circuits and applying said frequency $2f$ from a second one of said power supply circuits to the variable reactances in said second plurality of parallel resonant circuits and from a third power supply circuit to said output resonant circuit to vary the values of said reactances and thereby generate in said resonant circuits parametric oscillations having a frequency $f$ and one of two phases differing by 180 degrees from each other, means coupling each of said power supply circuits to respective ones of said resonant circuits in balanced bucking relationship so that said frequency 2f of the power supply circuits is not transmitted to said resonant circuits and the frequency f of said resonant circuits is not transmitted back to said power supply circuits, and means for controlling each of said power supply circuits for interrupting the oscillations of frequency f in preceding circuits at a time just after the parametric oscillations are generated in the succeeding resonant circuits, and means connected to at least said first and second pluralities of parallel resonant circuits to apply an even number of binary-coded phase control inputs to the individual resonant circuits of said first plurality to control the phase of the oscillations in said parallel resonant circuits to cause them to apply a preselected phase control input to said output resonant circuit in dependence upon the combination of binary-coded information data inputs and phase control inputs to said first and second pluralities of resonant circuits, whereby binary digits are represented by respective phases of the parametric oscillations and the phase of preselected combinations of the frequency f generated in preceding resonant circuits control the phase of the frequency f generated in subsequent resonant circuits and the oscillations generated in the subsequent resonant circuits is maintained even after the oscillations in the preceding resonant circuits are interrupted, and the phase of the output oscillation of said output resonant circuit is representative of a preselected one of the binary digit parallel inputs applied to said first pluralities of resonant circuits.

7. A data-transfer apparatus comprising, a first plurality of resonant circuits and at least one second stage resonant circuit in cascade therewith and an output resonant circuit in cascade with said second resonant circuit, means for applying an input to at least each of said first plurality of parallel resonant circuits simultaneously along respective parallel paths representative of binary-coded data and information, each resonant circuit having a resonant frequency of near f and each including an input, an output and a variable reactance the value of which is a parameter determining the resonant frequency of said resonant circuit, said first plurality of resonant circuits and second resonant circuit being coupled to each other with the output of at least some of the succeeding second stage resonant circuit, means for varying said parameters comprising at least three alternating power supply circuits each having a frequency 2f, means applying said 2f frequency from one of said power supply circuits to said variable reactances in said first plurality of resonant circuits and applying said frequency 2f from a second one of said power supply circuits to the variable reactances in said second stage resonant circuit and from a third power supply circuit to said output resonant circuit to vary the values of said reactances and thereby generate in said resonant circuits parametric oscillations having a frequency f and one of two phases differing by 180 degrees from each other, means coupling each of said power supply circuits to respective ones of said resonant circuits in balanced bucking relationship so that said frequency 2f of the power supply circuits is not transmitted to said resonant circuits and the frequency f of said resonant circuits is not transmitted back to said power supply circuits, and means for controlling each of said power supply circuits for interrupting the oscillations of frequency f in preceding circuits at a time just after the parametric oscillations are generated in the succeeding resonant circuits, and means connected to at least said first plurality of parallel resonant circuits to apply two phase control inputs to the individual resonant circuits to control the phase of the oscillations in said parallel resonant circuits to cause them to apply a preselected phase control input to said output resonant circuit in dependence upon the combination of binary-coded information data inputs and phase control inputs to said first plurality of resonant circuits, whereby binary digits are represented by respective phases of the parametric oscillations and the phase of preselected combinations of the frequency f generated in preceding resonant circuits control the phase of the frequency f generated in subsequent resonant circuits and the oscillations generated in the subsequent resonant circuits is maintained even after the oscillations in the preceding resonant circuits are interrupted, and the phase of the output oscillation of said output resonant circuit is representative of a preselected one of the binary digit parallel inputs applied to said first plurality of resonant circuits.

8. A data-transfer apparatus according to claim 7, in which said means for applying inputs to at least each of said first plurality of resonant circuits comprises means common to all of said first plurality of resonant circuits for applying a common input to each of said resonant circuits in said first plurality of resonant circuits.

9. A data-transfer apparatus according to claim 8, further including other parallel resonant circuits in said second stage, means connecting respective ones of said first plurality of resonant circuits in cascade with said other second stage resonant circuits, and means common to each of said other second stage resonant circuits for applying a common binary-coded input thereto.

10. A data-transfer apparatus according to claim 9, further including means connected to at least some of said first plurality of resonant circuits and means connected to at least some of said other second stage resonant circuits for inverting the phase of said common inputs to at least some of said resonant circuits in said first plurality and said second stage thereby to change the binary-coded value of the inputs to said some of said resonant circuits.

11. A data-transfer apparatus comprising, a first plurality of resonant circuits and at least a second plurality of parallel resonant circuits in cascade therewith and an output resonant circuit in cascade with said second plurality of resonant circuits, means for applying an odd number of respective inputs to at least respective ones of said first plurality of parallel resonant circuits simultaneously along respective parallel paths representative of binary-coded data and information, each resonant circuit having a resonant frequency of near f and each including an input, an output and a variable reactance the value of which is a parameter determining the resonant frequency of said resonant circuit, said first and second pluralities of resonant circuits being coupled to each other with the output of at least some of the preceding resonant circuits coupled to the input of respective succeeding resonant circuits, means for varying said parameters comprising at least three alternating power supply circuits each having a frequency 2f, means applying said 2f frequency from one of said power supply circuits to said variable reactances in said first plurality of resonant circuits and applying said frequency 2f from a second one of said power supply circuits to the variable reactances in said second plurality of parallel resonant circuits and from a third power supply circuit to said output resonant circuit to vary the values of said reactances and thereby generate in said resonant circuits parametric oscillations having a frequency f and one of two phases differing by 180 degrees from each other, means coupling each of said power supply circuits to respective ones of said resonant circuits in balanced bucking relationship so that said frequency 2f of the power supply circuits is not transmitted to said resonant circuits and the frequency f of said resonant circuits is not transmitted back to said power supply circuits, and means for controlling each of said power supply circuits for interrupting the oscillations of frequency f in preceding circuits at a time just after the parametric oscillations are generated in the succeeding resonant circuits, and means connected to at least said first and second pluralities of parallel resonant circuits to apply an even number of binary-coded phase control inputs to the individual resonant circuits to control the phase of the oscillations in said parallel resonant circuits to cause them to apply a preselected phase control input to said output resonant circuit in dependence upon the combination of binary-coded information data inputs and phase control inputs to said first and second pluralities of resonant circuits, whereby binary digits are represented by respective phases of the parametric oscillations and the phases of preselected combinations of the frequency $f$ generated in preceding resonant circuits control the phase of the frequency $f$ generated in subsequent resonant circuits and the oscillations generated in the subsequent resonant circuits is maintained even after the oscillations in the preceding resonant circuits are interrupted, and the phase of the output oscillation of said output resonant circuit is representative of a preselected one of the binary digit parallel inputs applied to said first plurality of resonant circuits.

12. A data-transfer apparatus comprising, a first plurality of resonant circuits and at least a second plurality of parallel resonant circuits in cascade therewith and an output resonant circuit in cascade with said second plurality of resonant circuits, means for applying one input to at least respective ones of said first plurality of parallel resonant circuits simultaneously along respective parallel paths representative of binary-coded data and information, each resonant circuit having a resonant frequency of near $f$ and each including an input, an output, and a variable reactance the value of which is a parameter determining the resonant frequency of said resonant circuit, said first and second pluralities of resonant circuits being coupled to each other with the output of at least some of the preceding resonant circuits coupled to the input of respective succeeding resonant circuits, means for varying said parameters comprising at least three alternating power supply circuits each having a frequency $2f$, means applying said $2f$ frequency from one of said power supply circuits to said variable reactances in said first plurality of resonant circuits and applying said frequency $2f$ from a second one of said power supply circuits to the variable reactances in said second plurality of parallel resonant circuits and from a third power supply circuit to said output resonant circuit to vary the values of said reactances and thereby generate in said resonant circuits parametric oscillations having a frequency $f$ and one of two phases differing by 180 degrees from each other, means coupling each of said power supply circuits to respective ones of said resonant circuits in balanced bucking relationship so that said frequency $2f$ of the power supply circuits is not transmitted to said resonant circuits and the frequency $f$ of said resonant circuits is not transmitted back to said power supply circuits, and means for controlling each of said power supply circuits for interrupting the oscillations of frequency $f$ in preceding circuits at a time just after the parametric oscillations are generated in the succeeding resonant circuits, and means connected to at least said first and second pluralities of parallel resonant circuits to apply an even number of binary-coded phase control inputs to the individual resonant circuits to control the phase of the oscillations in said parallel resonant circuits to cause them to apply a preselected phase control input to said output resonant circuit in dependence upon the combination of binary-coded information data inputs and phase control inputs to said first and second pluralities of resonant circuits, whereby binary digits are represented by respective phases of the parametric oscillations and the phase of preselected combinations of the frequency $f$ generated in preceding resonant circuits control the phase of the frequency $f$ generated in subsequent resonant circuits and the oscillations generated in the subsequent resonant circuits is maintained even after the oscillations in the preceding resonant circuits are interrupted, and the phase of the output oscillation of said output resonant circuit is representative of a preselected one of the binary digit parallel inputs applied to said first plurality of resonant circuits.

References Cited in the file of this patent
UNITED STATES PATENTS 2,815,488    Von Neumann ___________ Dec. 3, 1957